United States Patent [19]

Brown

[11] Patent Number: 4,716,818
[45] Date of Patent: Jan. 5, 1988

[54] AIR DISTRIBUTION DEVICE

[75] Inventor: Carlton E. Brown, Tucson, Ariz.

[73] Assignee: Air Concepts, Inc., Tucson, Ariz.

[21] Appl. No.: 835,169

[22] Filed: Mar. 3, 1986

[51] Int. Cl.$^4$ ............................................. F24F 13/10
[52] U.S. Cl. ................................. 98/40.02; 98/41.1;
98/41.2; 251/252; 251/266; 251/294; 251/339
[58] Field of Search .............. 98/2, 40.02, 41.1, 41.2,
98/101; 137/403; 251/264, 266, 270, 271, 339,
903, 294, 252

[56] References Cited

U.S. PATENT DOCUMENTS

| | | |
|---|---|---|
| 2,471,980 | 5/1949 | Maynard et al. .............. 98/41.1 X |
| 2,474,455 | 6/1949 | Babcock ............................. 98/41.1 |
| 2,747,495 | 5/1956 | Muller ........................... 98/42.02 X |
| 2,755,729 | 7/1956 | Galbraith et al. ........... 98/40.02 X |
| 2,974,580 | 3/1961 | Zimmerman et al. ........ 98/40.02 X |
| 2,983,215 | 5/1961 | Doolittle .................... 98/41.1 X |
| 3,099,949 | 8/1963 | Davidson . |
| 3,358,577 | 12/1967 | Thomson . |
| 3,387,550 | 6/1968 | Thomson . |
| 3,733,995 | 5/1973 | Brown . |
| 3,802,328 | 4/1974 | Kakizaki ..................... 98/40.02 X |
| 3,824,910 | 7/1974 | Temming ..................... 98/40.02 X |
| 3,974,755 | 8/1976 | Hohmann ........................ 98/40.02 |
| 4,497,241 | 2/1985 | Ohkata ........................... 98/40.25 |

FOREIGN PATENT DOCUMENTS

| | | | |
|---|---|---|---|
| 512169 | 8/1939 | United Kingdom ............... | 98/40.02 |
| 698523 | 10/1953 | United Kingdom ............... | 98/40.02 |

*Primary Examiner*—Harold Joyce
*Attorney, Agent, or Firm*—Richard R. Mybeck

[57] ABSTRACT

An air outlet having a ball shaped valve member having a central passageway defined therefrom intermediated a convergent entrance and an exit, the transverse area of the entrance being at least 45% greater than the transverse area of the exit. The valve members is rotatable through 360° and swayable through 60°. A damper arrangement selectively actuable between a totally closed and a totally non-obstructive position relative to said passageway is described having damper actuator means and damper guide means coacting to effect a preselected location of said damper relative to said passageway in the valve member.

9 Claims, 17 Drawing Figures

U.S. Patent  Jan. 5, 1988  Sheet 1 of 2  4,716,818
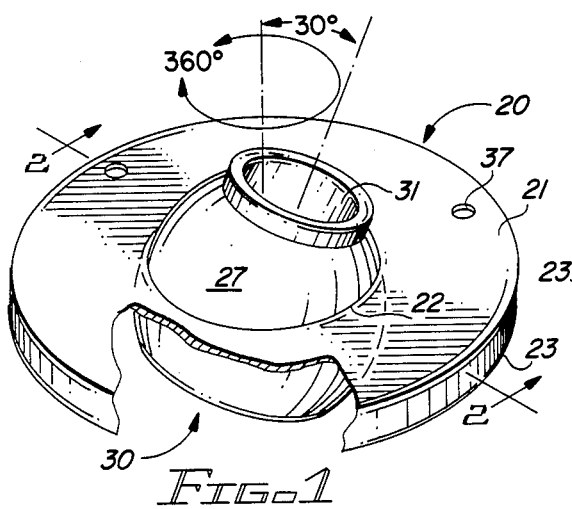
FIG.-1
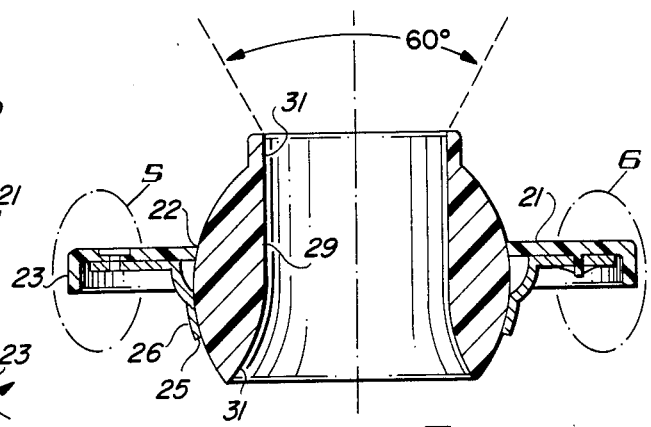
FIG.-2
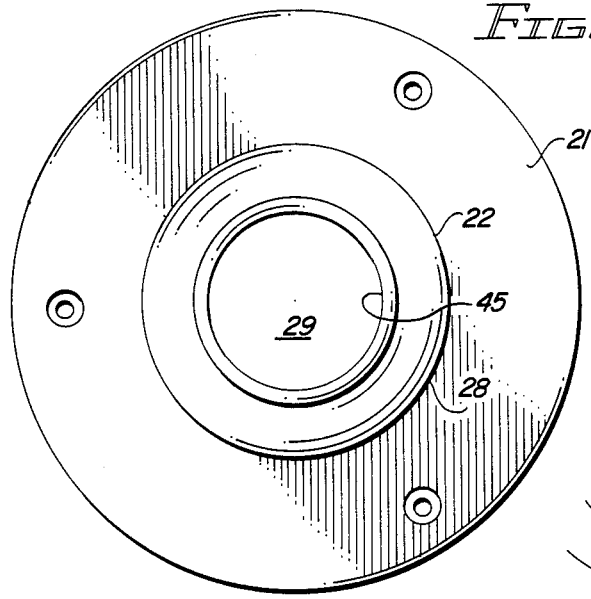
FIG.-3
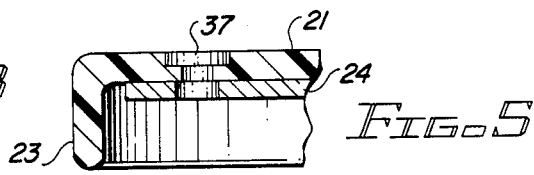
FIG.-5
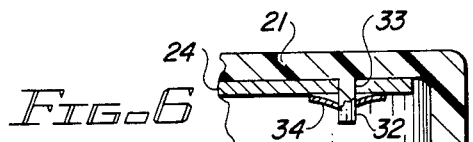
FIG.-6
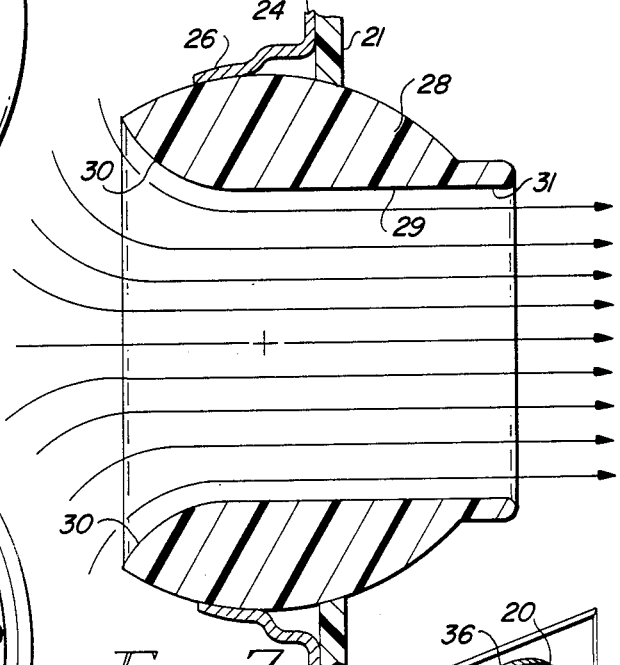
FIG.-7
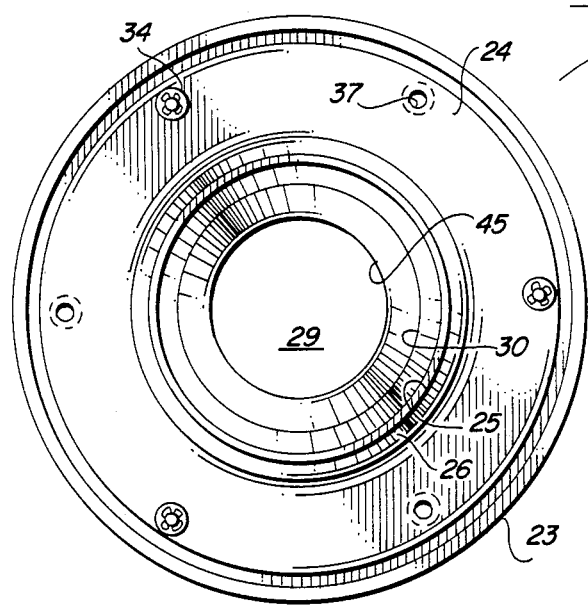
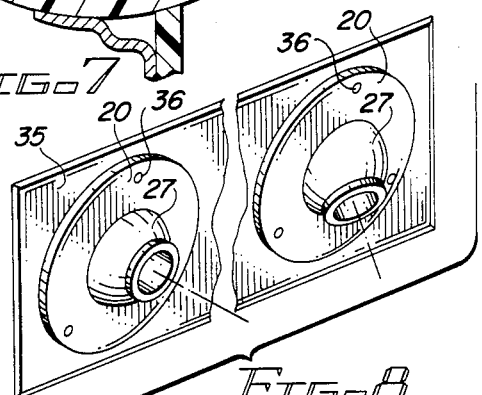
FIG.-8

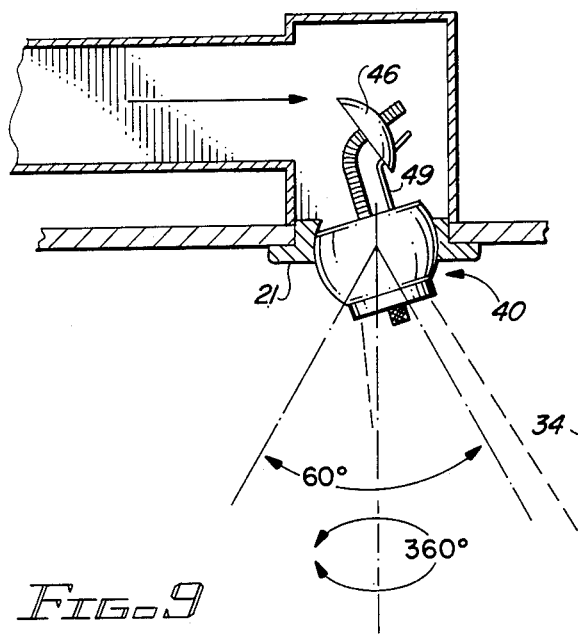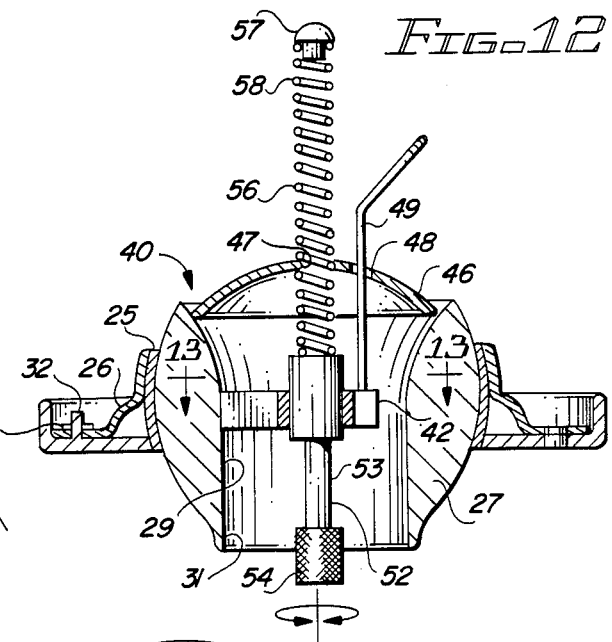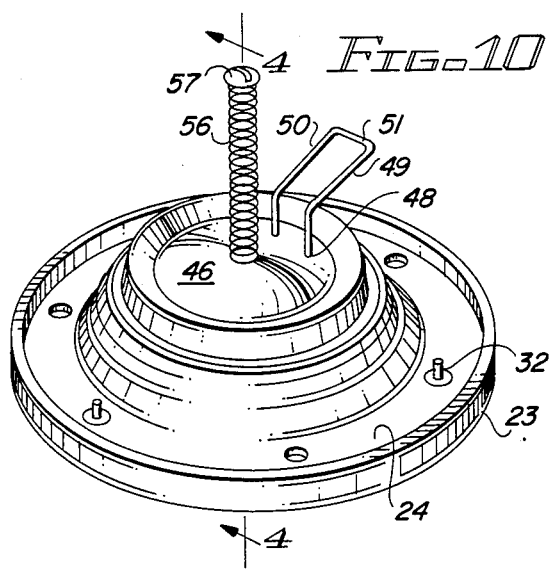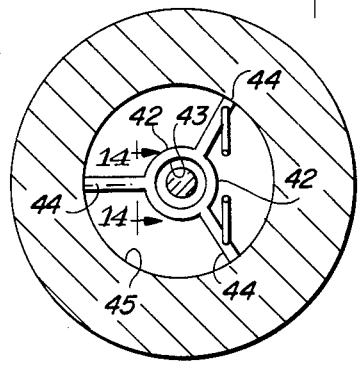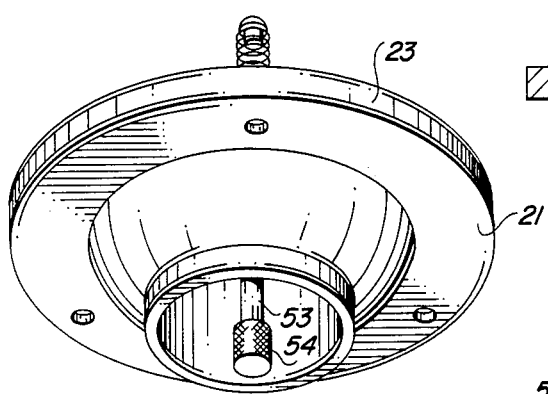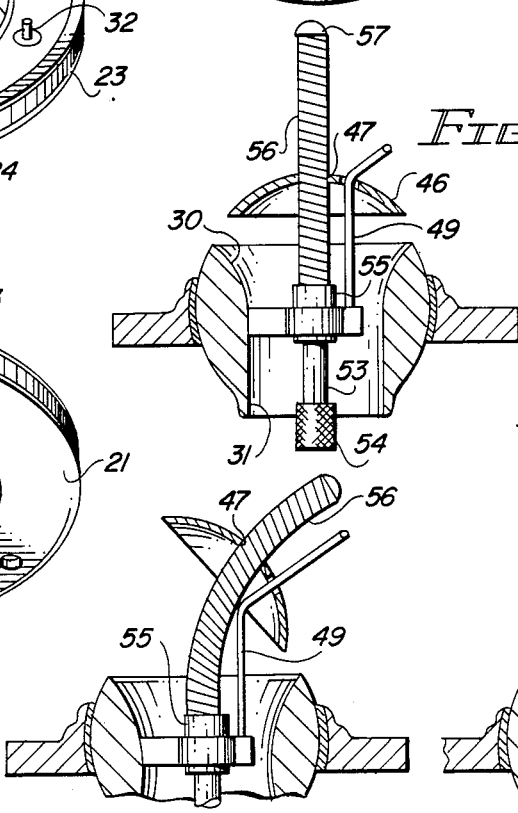

AIR DISTRIBUTION DEVICE

INTRODUCTION

The present invention relates generally to air distribution and more particularly to individual air outlets for use in new or existing air delivery systems whereby efficient and accurate task air distribution can be quickly and easily attained.

BACKGROUND OF THE INVENTION

The delivery of air in various parts of a building such as a residence or office building was a relatively easy matter when central heating was first introduced. Simple openings or registers were disposed strategically around the structure to introduce heated air adjacent the floor whereupon the propensity for heated air to rise was utilized to expand the heat throughout the desired area. One or more return ducts were placed at predetermined locations to recapture the air and return the now cooler air to the central unit for reheating.

The advent of central air conditioning somewhat complicated the parameters of the delivery system, especially when common duct work was desired. Now, not only the temperature, but the actual movement patterns and the moisture content of the moving air became important.

As the technology developed, it became more apparent that unless the direction and flow of the air into a given space could be more precisely controlled, the heating/air conditioning system would dictate the positioning of delicate wooden objects such as antique furniture, pianos and the like relative to the flow pattern developed, thereby usurping the homemakers right of choice as to how those items were to be arranged. Moreover, with the increasing popularity of computers and other temperature sensitive electronic appliances in the office place, a need arose to create spots of enhanced temperature control to protect such appliances without subjecting the operators thereof to a hostile human environment.

Through the years a variety of devices have been introduced for the purpose of enhancing the overall comfort and efficiency of heating and cooling systems. Air diffusing registers such as those described by Thomson in U.S. Pat. No. 3,358,577 used air deflector vanes to facilitate air diffusion. Davidson, in U.S. Pat. No. 3,099,949 disclosed an air distributor valve which afforded some control over the direction of flow of the air discharged therefrom which Thomson improved upon in U.S. Pat. No. 3,387,550 when he provided a self-contained valve which permitted the volume of air to be regulated without altering the flow pattern thereof. In 1973, Brown disclosed in U.S. Pat. No. 3,733,995 a new diffuser construction utilizing elongated parallel spaced-apart side walls interconnected by a bridge member having extensions fitting into channels provided therefor in the side walls. More recently, Ohkata, in U.S. Pat. No. 4,497,241, described means for automatically adjusting the angle of a louver pivotally secured in an air passage to manage the direction of flow.

In spite of all of these efforts, a need still exists for a quieter, more energy efficient air distribution device which is especially well suited for spot cooling and spot heating without impairing the nozzle discharge, disrupting the air pattern or altering the discharge characteristics of the air stream.

Moreover, the energy crisis and skyrocketing energy costs gave rise to a need for more efficient spot cooling and the elimination of draftless air diffusion whenever possible. In otherwords, strong economic incentives arose, particularly for industrial managers, to cease cooling areas where cooling was not required while enhancing the creature comfort of those employees whose cooling sensations respond to a draft which evaporates their body moisture.

The present invention is directed to solving the problems of the prior art by providing a readily adjustable, energy efficient, non-turbulent individual air outlet which avoids the noise, inconvenience and energy waste of the prior art devices and can be readily and efficiently controlled to provide a draft spot cooling to preselected locations.

SUMMARY OF THE INVENTION

The present invention is predicated upon the development of a novel and unique design for the nozzle discharge which by its convergence from its entrance to its exit provides a smooth non-turbulent conduit to deliver air flow to the desired site. Further, a new and unique damper arrangement is provided which is readily adjustable between a totally obstructive position to totally non-obstructive position in response to a simple force applied thereto whereby its precise control can be attained by even those unskilled in the field of heating and ventilating.

Accordingly, it is a principal object of the present invention to provide a new and improved air outlet which is simple to manufacture, easy to install and totally reliable in its operation.

Another object of the present invention is to provide a new and improved air outlet which provides accurate directional control of air flow and enhances the air movement and hence the comfort level in poorly conditioned zones or dead air spaces.

A further object of the present invention is to provide a novel and unique air outlet which is capable of creating high velocity air flow and long distance projection whereby substantial savings in duct work may be obtained without sacrificing ventilation in hard to reach areas.

A still further object of the present invention is to provide a new and improved air outlet capable of achieving a 60 degree global rotation without requiring special tools and an unrestricted air flow pattern through a 360° rotation about its centerline axis.

Still another object of the present invention is to provide a new and improved air outlet having a readily controlled damper assembly associated therewith capable of producing anywhere from 0 to 100 percent dampering effect by the ready manipulation of a simple manual control.

These and still further objects as shall hereinafter appear are readily fulfilled by the present invention in a remarkably unexpected fashion as will be readily discerned from the following detailed description of the preferred embodiments thereof, especially when read in conjunction with the accompanying drawing in which like parts bear like indicia throughout the several views.

THE DRAWINGS

In the drawing:

FIG. 1 is an isometric view, partially broken away, of an air outlet device embodying the present invention;

FIG. 2 is a cross-sectional view of the device of FIG. 1, taken along line 2—2 thereof;

FIG. 3 is a top view of the outlet of FIG. 1;

FIG. 4 is a bottom view of the outlet of FIG. 1;

FIG. 5 is an enlarged view of the fragment shown at 5 in FIG. 2;

FIG. 6 is an enlarged view of the fragment shown at 6 in FIG. 2;

FIG. 7 is a central cross section of the outlet of FIG. 1 showing the converging air flow pattern obtained thereby;

FIG. 8 is an isometric view of a multiple unit installation embodying the present invention;

FIG. 9 is a side view, partially in cross section of an alternative embodiment of the present invention in an overhead installation;

FIG. 10 is an isometric top view of the outlet of FIG. 9 with its damper closed;

FIG. 11 is an isometric lower view of the outlet of FIG. 9;

FIG. 12 is a cross section of the outlet of FIG. 10 taken along line 4—4 thereof;

FIG. 13 is a cross section taken along line 13—13 of FIG. 12;

FIG. 14 is a cross section taken along line 14—14 of FIG. 13; and

FIGS. 15 A, B, and C are side views, partially broken away, showing the outlet of FIG. 9 in various controlled damper positions.

DESCRIPTION OF PREFERRED EMBODIMENTS

Referring to the drawing, and particularly to FIGS. 1-4, one embodiment of an air outlet device prepared according to the present invention is identified by the general reference 20. Each device 20 comprises an annular face plate 21 having a circular aperture 22 defined therethrough and a peripheral flange 23 depending therefrom, an annular rear plate 24 having a circular aperture 25 defined therein by a spring-like flange 26 depending therefrom, and a generally ball-shaped valve member 27 having a spherical body portion 28 having a spherical diameter which is greater than the diameter of either aperture 22 or aperture 25 so that when interposed between face plate 21 and rear plate 24, body portion 28 will be secured therebetween for rotation relative thereto.

Body portion 28 has a cylindrical passageway 29 defined therethrough in communicative relationship between a tapered nozzle entrance 30 and nozzle exit 31.

Rear plate 24 is attached to face plate 21 (see FIGS. 2, 4 and 6) by the coaction of a plurality of inwardly protruding shaft members 32, each of which extends through a corresponding opening 33 defined through rear plate 24 for locking engagement by a spring steel shaft retainer 34 (See: FIG. 6).

To assemble device 20, valve member 27 is inserted into aperture 22 until it engages the periphery thereof and rear plate 24 is drawn toward face plate 21 until aperture 25 circumscribes the lower portion of body portion 28 and shafts 32 (three shown) pass through their respective openings 33. When shaft retainers 34 are locked in position, one each about each shaft member 32 on the distal end thereof, device 20 is completely assembled and ready to be installed on a preselected surface such as grill plate 35 by inserting an appropriate fastener such as self-tapping screw 36 through each opening 37 defined in face plate 21. Device 20 can likewise be readily installed directly to duct work or other surfaces having appropriate airway defined therethrough.

As shown in FIG. 7, the area of nozzle entrance 30 at its widest plane is deliberately at least 45 percent greater than the area of nozzle exit 31 so that the air flow can be accelerated in a smooth non-turbulent fashion through passageway 29 from a lower velocity at entrance 30 to a higher exit velocity at nozzle exit 31 and for other reasons which shall be hereinafter described.

Referring to FIGS. 8-15, an alternative embodiment of the present invention is identified by the general reference 40. Each device 40 comprises an annular face plate 21 having a circular aperture 22 defined therethrough and peripheral flange 23 depending therefrom, an annular rear plate 24 having a circular aperture 25 defined therein by a spring-like flange 26 depending therefrom, and a generally ball-shaped valve member 27 having a spherical body portion 28 of which the spherical diameter is greater than the diameter of either aperture 22 or aperture 25 so that when valve member 27 is interposed between face plate 21 and rear plate 24, body portion 28 will partially protrude through aperture 22 and aperture 25 and be secured therebetween for rotation relative thereto.

Body portion 28 has a cylindrical passageway 29 defined therethrough in communicative relationship between an outwardly diverging nozzle entrance 30 and nozzle exit 31.

Operatively interposed between nozzle entrance 30 and nozzle exit 31 and adjacent nozzle entrance 30, is torsion free centering arrangement 42 having an annular center portion 43 and three or more equispaced support arms extending radially therefrom into engagement with the inner surface 45 of passageway 29.

Device 40 further comprises a dome shaped damper 46 having a central opening 47 defined therethrough and a diameter at its open edge which is less than the diameter of nozzle entrance 30 but greater than the diameter of cylindrical passageway 29 so that when, as will hereafter be described in greater detail, it is desired to close passageway 29, damper 46 will seat within the nozzle entrance and prevent the flow of air through passageway 29.

Damper 46 further is provided with a pair of holes 48 adjacent one edge thereof for receiving and riding upon damper guide 49 which comprises parallel wire members which are seated upon adjacent support arms 44 and extend upwardly therefrom until substantially clear of nozzle entrance 30 whereupon they bend or curve away therefrom to engage connecting member 51 disposed outside of the extended plane of cylindrical passageway 29. In my preferred embodiment, arms 44 and member 51 can be formed as a unitary structure.

A damper actuator means 52 is disposed axially through annular center portion 43 and the central opening 47 in damper 46 and comprises a shaft 53 operatively disposed between a knurled knob 54 and cylindrical connector means 55 and a flexible spring member 56 extending upwardly from its secure seated engagement in connector means 55 to a terminal detent 57 secured in the distal end 58 thereof. The outer diameter of the coils of spring member 56 will be larger than the diameter of opening 47 to permit damper 46 to move relative to spring member 56 in response to the rotation of spring 56 by turning knob 54.

Alternative embodiment 40 can be readily assembled using device 20 as a basic unit and modifying valve member 27 to conform to the alternative design by installing centering arrangement 42 into passageway 29 and thereafter mounting damper 46 by placing flexible spring 56 through opening 47 before securing it to connector 55 and feeding wire members 50 of damper guide 49 through damper guide holes 48 in damper 46 before seating them respectively in support arms 44, 44.

Next, connector 55 is secured in the annular center portion 43 of centering arrangement 42 and shaft 53, having the knob 54 secured thereto is fitted into the underside of connector 55 and secured thereto.

When locating nozzle exit 31 relative to the area which the respective devices 20,40 are installed for spot conditioning, both device 20 and device 40 provide a 360° rotation of valve member 27 relative to and within face plate 21 and a 60° total angular range, ±30° relative to the central perpendicular axis of the respective devices 20, 40 as installed.

In addition to the foregoing mobility in site for controlling the direction of the flow of air passing out of nozzle exit 31, air outlet device 40 has the further ability to selectively adjust the pattern and volume of that air flow into the tapered nozzle entrance 30 from full circular to crescent to annular to fully closed so that different needs of a particular spot can be readily achieved.

This adjustment is obtained by rotating knob 54 in either a clockwise or a counter-clockwise direction whereupon the position of damper 46 on damper guide 49 and damper actuator means 52 will be varied either toward or away from nozzle entrance 30.

More particularly, the rotation of knob 54 in turn rotates shaft 53, connector 55 and flexible spring member 56 causing damper 46 to migrate up or down the coils or spring 56, depending on the direction of rotation, and, at the same time, move damper 46 up or down damper guide 49. As readily apparent in FIGS. 15 A, B, and C, such movement adjusts not only the distance the damper 46 is disposed from nozzle exit 31 but the degree of obstruction created by damper 46 relative to the flow of air through the device 40 from a totally closed (See FIG. 10) to a totally open (See FIG. 15C) position.

From the foregoing, it is readily apparent that air outlet devices have been herein described and illustrated which fulfill all of the aforestated objectives in a remarkably unexpected fashion. It is of course understood that such modifications, alterations and adaptations, as may readily occur to the artisan skilled in the field to which this invention pertains when confronted with this specification, are intended within the spirit of the present invention which is limited only by the scope of the claims appended hereto.

Accordingly what is claimed is:

1. An air outlet comprising a face plate having a first circular aperture defined therethrough and a plurality of shaft members extending orthogonally therefrom; a rear plate having a plurality of openings defined therethrough in registry with said shaft members for receiving said shaft members in registered passage therethrough to attach said rear plate to said face plate, said rear plate having a second circular aperture defined therethrough; a plurality of shaft retainer means, each operatively securable about a different one of said shaft members to secure said rear plate to said face plate; a valve member having a spherical body portion having a diameter larger than the diameter of either said first and said second circular aperture and operatively interposed between said face plate and said rear plate for engagement therewith and rotation relative thereto, said valve member having a cylindrical passageway defined centrally therethrough between a tapered entrance and an exit, said tapered entrance having a transverse area which is greater than the transverse area of said exit; a torsion free centering assembly mounted within the centrally disposed cylindrical passageway of said valve member; an axially extending damper actuator means mounted through said centering assembly and having an adjusting means at one end thereof and a flexible spring member at the other end thereof; a dome-shaped damper circumscribed about said spring member and axially mobile in response to the rotation thereof; and damper guide means extending through said damper into seated engagement upon said centering assembly for directing said damper between totally obstructive engagement within said nozzle entrance to a totally non-obstructive position relative to said central passageway as said damper migrates upon said spring member in response to the rotation of said adjusting means.

2. An air outlet according to claim 1 in which the central axis of said central passageway in said valve member is moveable relative to an axis normal to said face place to define an angle of up to 30° therewith.

3. An air outlet according to claim 1 which said valve member is rotatable relative to said face plate through 360°.

4. An air outlet according to claim 1 which said face plate has a plurality of shafts depending therefrom, said rear plate has a plurality of openings defined therethrough in registry with said shafts for receiving one of said shafts in registered passage through each of said openings in said rear plate; and shaft retainer means operatively securable about said shaft member to secure said rear plate to said face plate.

5. An air outlet according to claim 1 in which said rear plate comprises an annular body portion and a spring-like flange depending therefrom to define said second circular aperture therethrough.

6. An air outlet according to claim 1 in which said dome-shaped damper has a convex surface and a concave surface, said concave surface facing said valve member, said damper having a central opening defined therethrough having a diameter smaller than the outside diameter of said flexible spring means.

7. An air outlet according to claim 1 in which said damper guide means comprises a first wire, a second wire, and a connecting member, said first and said second wire being disposed in spaced parallel relationship to each other, each of said wires having a first portion extending axially of said central passageway and a second portion disposed angularly to said first portion and extending outwardly therefrom to a distal end disposed outside of the extended plane of said cylindrical passageway, said connecting member joining said distal end of said first wire with the distal end of said second wire to limit the movement of said domed-shaped damper relative thereto.

8. An air outlet according to claim 7 in which said flexible spring means yields in response to the outbound movement of said damper on said damper guide means to maintain a substantially constant spatial relationship between said spring means and said damper guide means.

9. An air outlet according to claim 8 in which said dome-shaped damper has a convex surface and a concave surface, said concave surface facing said valve member, said damper having a central opening defined therethrough having a diameter smaller than the outside diameter of said flexible spring means.

* * * * *